US012576701B2

(12) United States Patent
Wells et al.

(10) Patent No.: US 12,576,701 B2
(45) Date of Patent: Mar. 17, 2026

(54) SUNROOF ASSEMBLY WATER MANAGEMENT SYSTEM

(71) Applicant: Aisin Corporation, Kariya (JP)

(72) Inventors: Alexander Wells, New Hudson, MI
(US); Glover A. Kosch, Ann Arbor, MI
(US); Michael A. Mixon, Brighton, MI
(US); Jacob C. Grimaldo, Westland,
MI (US)

(73) Assignee: AISIN CORPORATION, Kariya (JP)

( * ) Notice: Subject to any disclaimer, the term of this
patent is extended or adjusted under 35
U.S.C. 154(b) by 427 days.

(21) Appl. No.: 18/461,138

(22) Filed: Sep. 5, 2023

(65) Prior Publication Data

US 2025/0074167 A1    Mar. 6, 2025

(51) Int. Cl.
| | |
|---|---|
| *B60J 7/00* | (2006.01) |
| *B60J 7/22* | (2006.01) |
| *B60J 10/21* | (2016.01) |
| *B60J 10/90* | (2016.01) |

(52) U.S. Cl.
CPC .............. *B60J 7/0084* (2013.01); *B60J 7/22*
(2013.01); *B60J 10/21* (2016.02); *B60J 10/90*
(2016.02)

(58) Field of Classification Search
CPC . B60J 7/0084; B60J 10/21; B60J 10/90; B60J
7/22
See application file for complete search history.

(56) References Cited

U.S. PATENT DOCUMENTS

| | | | | |
|---|---|---|---|---|
| 7,780,228 B2 * | 8/2010 | Rashidy | ................ | B60J 7/0435 |
| | | | | 296/222 |
| 7,922,242 B2 * | 4/2011 | Comfort | .................. | B60J 7/022 |
| | | | | 296/223 |
| 8,403,406 B2 | 3/2013 | Fukami et al. | | |
| 9,290,087 B2 | 3/2016 | Nellen et al. | | |
| 9,873,314 B1 | 1/2018 | Grimaldo et al. | | |
| 10,647,188 B2 * | 5/2020 | van de Westerlo | ...... | B60J 10/82 |
| 11,840,129 B2 * | 12/2023 | Ten-Jet-Foei | ............ | B60J 10/90 |
| 2022/0379694 A1 | 12/2022 | Sawahata et al. | | |

FOREIGN PATENT DOCUMENTS

| | | | | |
|---|---|---|---|---|
| CN | 111231635 A | | 6/2020 | |
| CN | 212098383 U | | 12/2020 | |
| CN | 214564538 U | * | 11/2021 | |
| DE | 102016106001 B4 | | 2/2021 | |
| WO | 2009071043 A1 | | 6/2009 | |
| WO | 2013164057 A1 | | 11/2013 | |
| WO | WO-2024149812 A1 | * | 7/2024 | ................ B60J 7/22 |

* cited by examiner

*Primary Examiner* — Faye M Fleming
(74) *Attorney, Agent, or Firm* — Sughrue Mion, PLLC

(57) ABSTRACT

A sunroof assembly includes a bracket configured for attachment to a sunroof panel. The sunroof assembly also includes a guiderail supporting movement of the bracket, whereby movement of the bracket causes movement of the sunroof panel. The sunroof assembly further includes a housing defining a housing wall, wherein the housing wall and the guiderail form a boundary wall separating a wet area of the sunroof assembly from a dry area of the sunroof assembly, and wherein the bracket straddles the boundary wall such that a first side of the bracket is located in the wet area and a second side of the bracket is located in the dry area.

20 Claims, 5 Drawing Sheets

SUNROOF ASSEMBLY WATER MANAGEMENT SYSTEM

TECHNICAL FIELD

The subject matter described herein relates, in general, to sunroof assemblies and, more particularly, to water management systems for sunroof assemblies.

BACKGROUND

In some vehicles, sunroof assemblies include a deflector for diffusing high pressure air traveling over the vehicle when the sunroof assembly is open. In some instances, when the sunroof assembly is closed, moisture or water such as rainwater may enter into areas of the sunroof assembly. Accordingly, some sunroof assemblies include water management systems designed to drain moisture or water away from the functional components of the sunroof assembly, for example, the components configured to drive the sunroof assembly between an open and closed position. In some instances, moisture or water may enter into an area where the deflector is housed, which may cause damage to the deflector, or which may cause moisture or water to enter the vehicle when the sunroof is open.

SUMMARY

Example systems and other embodiments relate to water management for a sunroof assembly. In some instances, water, such as rainwater, or other moisture, may enter various components of a sunroof assembly from above the vehicle. In such instances, water may cause damage to or other issues regarding a deflector of the sunroof assembly. Accordingly, it is advantageous to house the deflector in a designated dry area of the sunroof assembly that is separated from a designated wet area of the sunroof assembly.

In at least one configuration, a sunroof assembly includes various components that form a boundary wall that separates a dry area, where the deflector is housed, from a wet area. In one arrangement, a housing of the sunroof assembly includes a housing wall that separates the wet area from the dry area within the housing. Accordingly, within the housing, the housing wall forms the boundary wall. Moreover, in one arrangement, a guiderail of the sunroof assembly separates the wet area from the dry area past the area of the housing. Accordingly, the guiderail forms the boundary wall past the housing.

At the area where the guiderail is attached to the housing, in other words, where the housing wall meets the guiderail, various components of the sunroof assembly work together to create the boundary wall. For example, in one arrangement, a bracket of the sunroof assembly that supports a sunroof panel straddles the guiderail such that one side of the bracket is in the wet area and one side of the bracket is in the dry area. Additionally, in one arrangement, the bracket has a sloped top angled toward the side of the bracket that is in the wet area. Placement of the bracket in this manner promotes the flow of water off the sloped top, toward the wet area, and down the side of the bracket into the wet area. In another example, in one arrangement, the bracket is placed above various components of the sunroof assembly that meet under the bracket. For example, in one instance, the guiderail meets a front guide of the sunroof assembly under the bracket. Accordingly, in one arrangement, the bracket side that is in the wet area extends past the area where the guiderail meets the front guide to help prevent the flow of water through a space between the front guide and the guiderail.

In one arrangement, the aforementioned components of the sunroof assembly may, when assembled, have small spaces between them due to manufacturing tolerances. Accordingly, the sunroof assembly, in one arrangement, also includes a seal. Various portions of the seal are, in one instance, located at the junctions where the guiderail meets the housing and/or the front guide. Thus, in one arrangement, the seal substantially seals water from entering the dry area through the small spaces and contacting the deflector.

The arrangements described herein have the benefit of providing designated and substantially sealed-off wet and dry areas of a sunroof assembly. This allows the deflector to be housed in the dry area to substantially prevent water from contacting the deflector, thus limiting significant issues to the deflector and caused by use of the deflector when wet.

In one embodiment, a sunroof assembly includes a bracket configured for attachment to a sunroof panel. The sunroof assembly also includes a guiderail supporting movement of the bracket, whereby movement of the bracket causes movement of the sunroof panel. The sunroof assembly further includes a housing defining a housing wall. The housing wall and the guiderail form a boundary wall separating a wet area of the sunroof assembly from a dry area of the sunroof assembly. The bracket straddles the boundary wall such that a first side of the bracket is located in the wet area and a second side of the bracket is located in the dry area.

In another embodiment, a sunroof assembly includes a bracket configured for attachment to a sunroof panel. The sunroof assembly also includes a guiderail supporting movement of the bracket, whereby movement of the bracket causes movement of the sunroof panel. The sunroof assembly further includes a housing defining a housing wall. The housing wall and the guiderail form a boundary wall separating a wet area of the sunroof assembly from a dry area of the sunroof assembly where a deflector is housed. The bracket straddles the boundary wall such that a first side of the bracket is located in the wet area and a second side of the bracket is located in the dry area. The first side of the bracket extends past the boundary wall to substantially prevent moisture from entering the dry area and contacting the deflector.

In yet another embodiment, a sunroof assembly includes a bracket configured for attachment to a sunroof panel. The sunroof assembly also includes a guiderail supporting movement of the bracket, whereby movement of the bracket causes movement of the sunroof panel. The sunroof assembly further includes a housing at least partially underlying the guiderail and defining a housing wall. The housing wall and the guiderail form a boundary wall separating a wet area of the sunroof assembly from a dry area of the sunroof assembly. The sunroof assembly further includes a seal located between the guiderail and the housing where the housing underlies the guiderail. The seal substantially prevents moisture from entering the dry area through a space between the guiderail and the housing.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Figure 1A:
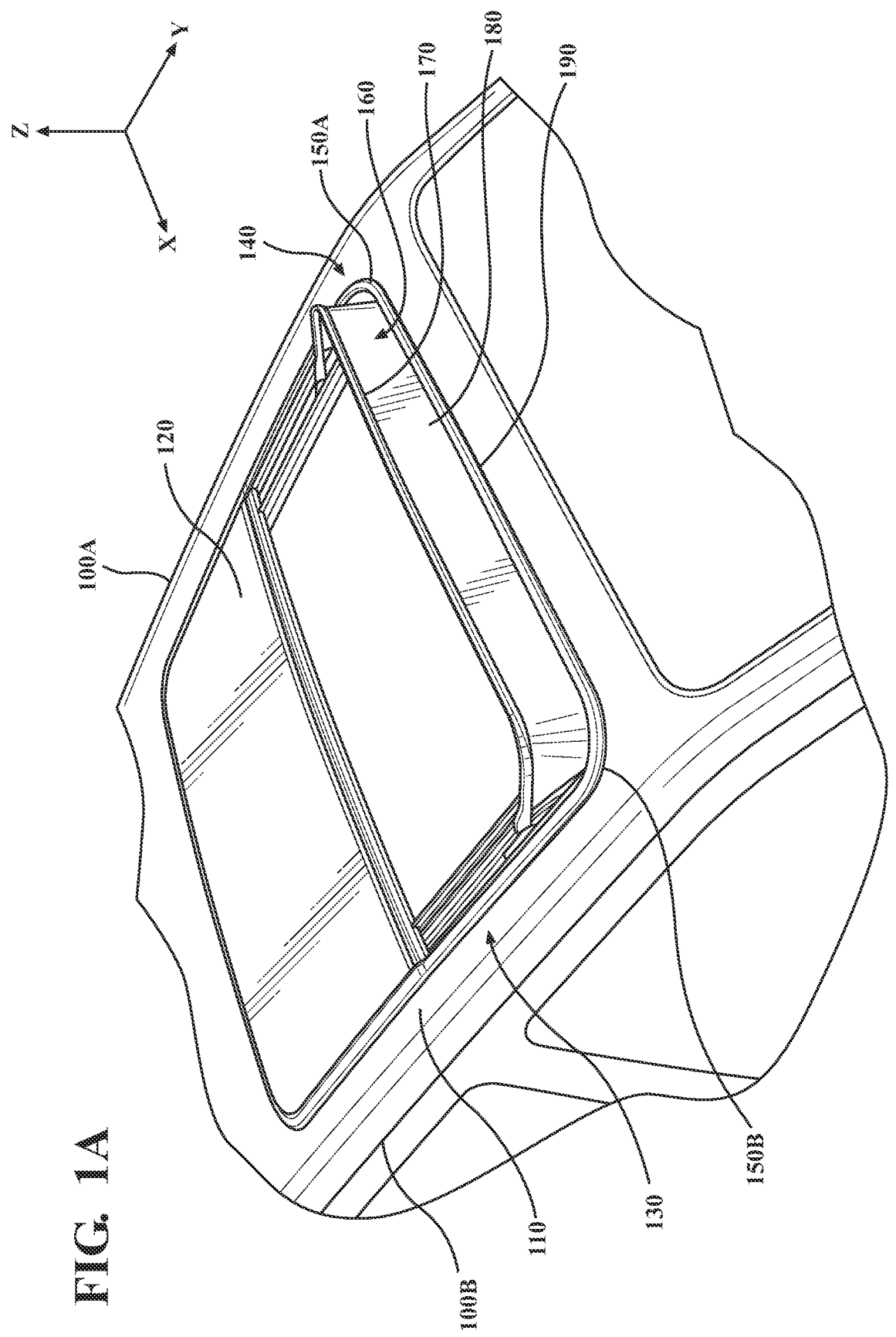
FIG. 1A illustrates a portion of a perspective view of a vehicle including a sunroof assembly.

Systems and other embodiments associated with a water management system of a sunroof assembly are disclosed. In some instances, water or other moisture may enter various components of a sunroof assembly, for example, when the vehicle is exposed to rain. Water may cause damage or other issues regarding use of a deflector of the sunroof assembly, which expands above the vehicle when the sunroof assembly is open to direct air flow over the vehicle and mitigate noise caused by wind. Accordingly, systems and other arrangements described herein provide designated wet and dry areas of a sunroof assembly to enable the deflector to be housed in a dry area where a substantial amount of water will not contact the deflector.

According to the arrangements described herein, a sunroof assembly includes various components that form a boundary wall that separates the wet area from the dry area. In one arrangement, a housing of the sunroof assembly includes a housing wall that separates the wet area from the dry area within the housing. Additionally, in one arrangement, a guiderail of the sunroof assembly separates the wet area from the dry area past the area of the housing. Accordingly, the boundary wall is formed by the housing wall at an area within the housing and by the guiderail at an area past the housing.

At the area where the guiderail is attached to the housing, various components of the sunroof assembly work together to create the boundary wall. For example, in one arrangement, a bracket of the sunroof assembly that supports a sunroof panel straddles the guiderail such that one side of the bracket is in the wet area and one side of the bracket is in the dry area. Additionally, in one arrangement, the bracket has a sloped top angled toward the side of the bracket that is in the wet area such that water flows down the sloped top, toward the wet area, and down the side of the bracket into the wet area. In another example, in one arrangement, the bracket is placed above various components of the sunroof assembly that meet where the guiderail is attached to the housing. For example, in one instance, the guiderail meets a front guide of the sunroof assembly under the bracket. Accordingly, in one arrangement, the bracket side that is in the wet area extends past the area where the guiderail meets the front guide to help prevent the flow of water through a space between the front guide and the guiderail.

In one arrangement, the aforementioned components of the sunroof assembly may, when assembled, have small spaces between them due to manufacturing tolerances. Accordingly, the sunroof assembly, in one arrangement, also includes a seal of which various portions are located at the junctions where the guiderail meets the housing and/or the front guide. Thus, in one arrangement, the seal substantially seals water from entering the dry area through the small spaces and contacting the deflector.

As mentioned above, the arrangements described herein have the benefit of providing a separate wet area of the sunroof assembly from a dry area of the sunroof assembly where the deflector is stored. Separation of the wet and dry areas substantially prevents water from contacting the deflector, thus limiting significant issues to the deflector that result from the deflector contacting water.

Figure 1B:
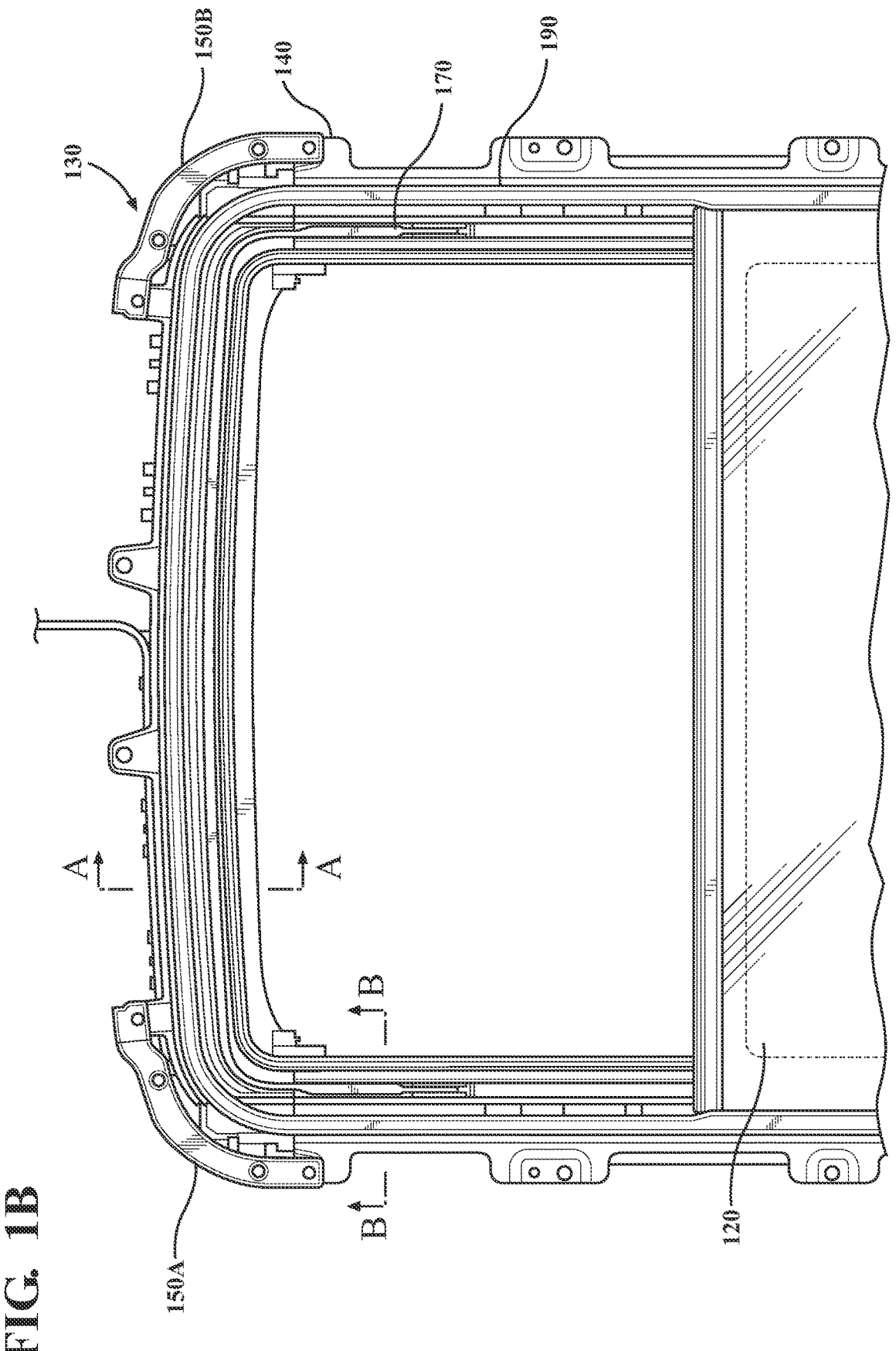
FIG. 1B illustrates an overhead view of a portion of the sunroof assembly.

Part of a representative passenger vehicle is shown in FIGS. 1A and 1B. In this description, uses of "front," "forward," and the like, and uses of "rear," "rearward," and the like, refer to the longitudinal directions of the vehicle. "Front," "forward," and the like refer to the front (fore) of the vehicle, while "rear." "rearward," and the like refer to the back (aft) of the vehicle. Uses of "side," "sideways," "transverse," and the like refer to the lateral directions of the vehicle. Uses of "above." "below," and the like refer to the vertical directions of the vehicle.

The vehicle includes an exterior and a number of interior compartments. The compartments include, for example, a passenger compartment, an engine compartment, a cargo area, and the like. Among other things, in some arrangements, the vehicle includes seats, a dash assembly, an instrument panel, controls, and the like housed in the passenger compartment. Additionally, in some arrangements, the vehicle includes an engine, a motor, a transmission, and the like, as well as other powertrain components, such as wheels, housed in the engine compartment and elsewhere in the vehicle. The wheels support the remainder of the vehicle on the ground. In one approach, one, some or all of the wheels are powered by the remainder of the powertrain components to drive the vehicle along the ground.

The vehicle includes a body that forms the exterior and defines or otherwise encloses the compartments. In one arrangement, the body includes a first side 100A, a second side 100B, a horizontal roof 110, a floor, a front end, a rear end, and the like. The body is constructed, in one approach, from a combination of rigidly interconnected frame members, panels, and other body elements, as well as a combination of overlying paneling, trim, upholstery, and other body coverings. In some instances, the body elements have a combination of fabricated, bent, stamped, extruded, cast, molded and like constructions, and are made from a combination of metallic, polymeric and like materials.

The roof 110 extends laterally between the first side 100A and the second side 100B. As part of the roof 110, the body includes a sunroof opening that opens between the passenger compartment and the exterior. Moreover, in one arrangement, the body includes a roof panel that defines the sunroof opening. Moreover, the body includes, in some instances, a pair of roof rails and, as part of the roof panel, a roof header, that frame the sunroof opening. In one arrangement, the roof rails are laterally spaced apart from one another about the sunroof opening and extend longitudinally. The roof panel extends longitudinally from the roof header, and laterally between the roof rails, in one example. Moreover, in one arrangement, the roof header is forward of the sunroof opening and extends laterally between the roof rails. In an assembled state, the roof rails, the roof panel, and the roof header are secured to one another. The roof panel, including the roof header, is secured to the roof rails along its length. The roof header, as part of the roof panel, is secured to the roof rails at its ends.

The body further includes a sunroof panel 120 that extends between the first side 100A and the second side 100B and which opens and closes the sunroof opening. A sunroof assembly 130 is configured for installment to the sunroof panel 120 about the sunroof opening. As used herein, the term "sunroof" includes similar roof openings for vehicles, including moonroofs, panoramic roofs, etc. When the sunroof assembly 130 is in an open position, as shown in FIGS. 1A and 1B, the sunroof panel 120 opens the sunroof opening, and in a closed position, the sunroof panel 120 closes the sunroof opening. The sunroof panel 120 can be made from a material used for closing the passenger compartment from an external environment of the vehicle while allowing a passenger in the vehicle to see through the sunroof panel 120 when the sunroof panel 120 is in the closed position. In one example, the sunroof panel 120 is made of glass, but it should be understood that the sunroof panel 120 can be made of one or more other materials. Although the sunroof assembly 130, as shown, includes one sunroof panel 120, it will be understood that this disclosure is applicable in principle to otherwise similar vehicles whose sunroof assemblies include multiple sunroof panels. The sunroof assembly 130 also includes one or more sunshades, driving equipment for moving the sunroof panel 120 and the sunshades between the open position and the closed position, and like elements typical of sunroof assemblies.

In one arrangement, the sunroof assembly 130 also includes a housing 140. The housing 140 serves to house various components of the sunroof assembly 130. The housing 140 also supports various components of the sunroof assembly 130 for attachment to the vehicle. The housing 140 is attached to the roof header and/or other components of the vehicle. In some arrangements, the housing 140 has a shape that substantially matches the sunroof opening. Accordingly, the housing 140 has a first front corner 150A and a second front corner 150B that align with the sunroof opening. In one example, the first front corner 150A and/or the second front corner 150B have a curved shape that substantially matches the sunroof opening. While the remainder of this disclosure is described with reference to the first front corner 150A, it will be understood that the description herein also applies to the second front corner 150B.

In one arrangement, the sunroof assembly 130 also includes a deflector 160. As shown, in one example, the deflector 160 is stored in the housing 140 and is hingedly connected to the housing 140. In one arrangement, the deflector 160 includes a deflector arm 170 and a mesh 180 connected to the deflector arm 170 and to the housing 140. The deflector 160 is arranged, in one approach, to expand above the housing 140 when the sunroof assembly 130 is in the open position and retract under the sunroof panel 120 when the sunroof assembly 130 is in the closed position. As the vehicle travels in a forward direction with the sunroof panel 120 in an open or partially open position, the mesh 180 may be stretched to a tautness such that the mesh 180 directs airflow over the sunroof opening and diffuses high pressure air in such a way as to reduce wind noise and turbulent airflow into the passenger compartment than if the mesh 180 were not in an extended position with the sunroof panel 120 in the same open or partially open position. In one arrangement, the deflector 160 is in the housing 140 when the sunroof panel 120 is in the closed position and expands above the housing 140 when the sunroof panel 120 is in the open position.

In one arrangement, the sunroof assembly 130 also includes a weatherstrip 190. In one example, the weatherstrip 190 is connected to the roof 110 and the sunroof assembly 130 about the sunroof opening and substantially seals the passenger compartment from the external environment of the vehicle. More specifically, the weatherstrip 190 is connected to the roof 110 around the sunroof opening, in one example, and substantially seals small gaps between the sunroof assembly 130 and the roof 110 when the sunroof panel 120 is in the closed position. In one example, the weatherstrip 190 is formed from a substantially weatherproof, flexible, and durable material, such as rubber. In one example, the weatherstrip 190 is a bulb seal formed from an extrusion process, but it should be understood that the weatherstrip 190 can be another type of seal formed from another type of process.

In some instances, when the sunroof assembly 130 is in the closed position, water from the external environment of the vehicle may contact the roof 110, drip through slight gaps between the weatherstrip 190 and the roof panel, and enter various areas of the sunroof assembly 130. As used herein, "water" includes water, for example, rainwater, or another kind of moisture that may enter the sunroof assembly 130. In some instances, water may cause issues with the deflector 160 if the water enters the area of the housing 140 where the deflector 160 is located.

For example, if the deflector 160 becomes wet and does not have an opportunity to completely dry, water may cause the materials of the deflector 160 to break down and become damaged over time. Moreover, if the deflector 160 becomes wet and is exposed to freezing temperatures, the deflector 160 may not be able to expand when the sunroof panel 120 is moved to the open position. Additionally, if the deflector 160 becomes wet and is subsequently expanded over the housing 140 when the sunroof panel 120 is opened, wind may cause water on the deflector 160 to enter the passenger compartment, which may cause passengers in the vehicle to become wet, cause dirt on the deflector 160 to enter the passenger compartment, and/or cause water damage to interior components of the vehicle.

Accordingly, in addition to the above-described components, the sunroof assembly 130 also includes a water management system for keeping the deflector 160 substantially dry. As used herein, the term "dry" means substantially free of water or other moisture that may cause damage to the deflector 160, cause the deflector 160 to perform suboptimally, cause the deflector 160 to become dirty, and/or cause other issues to the deflector 160 or related with use of the deflector 160. In one approach, the water management system includes various components of the sunroof assembly 130 that function together to separate a wet area of the sunroof assembly 130 and a dry area of the sunroof assembly 130, where the deflector 160 is stored.

Figure 2A:
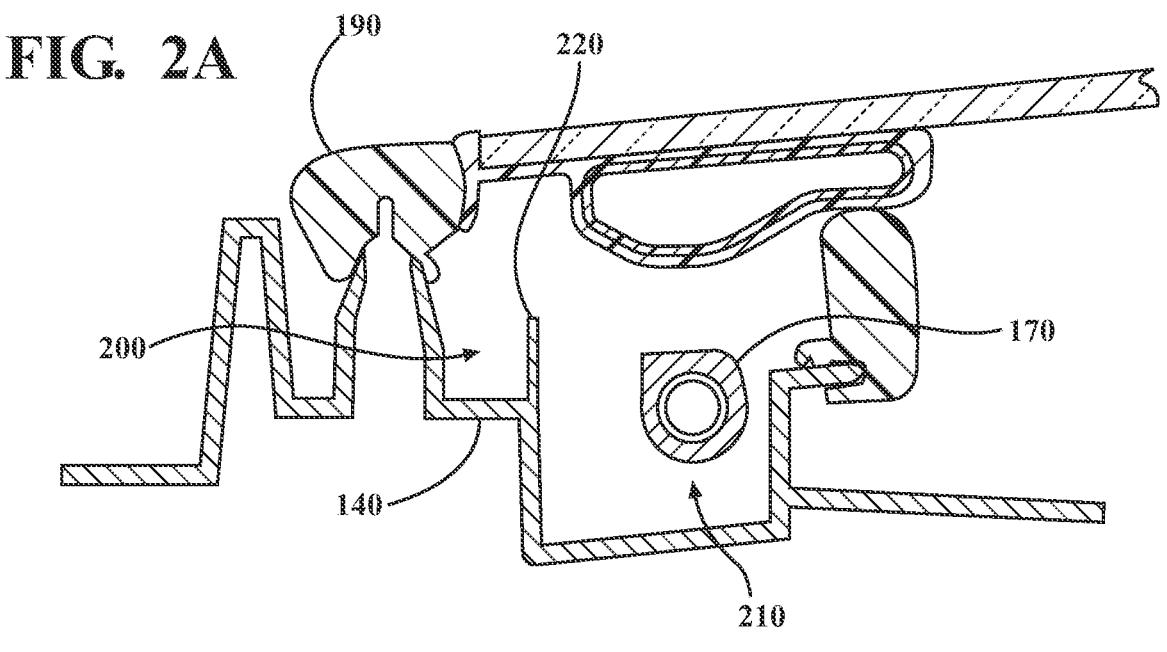
FIG. 2A illustrates a cross-sectional view of the sunroof assembly taken along the line A-A of FIG. 1B
Figure 2B:
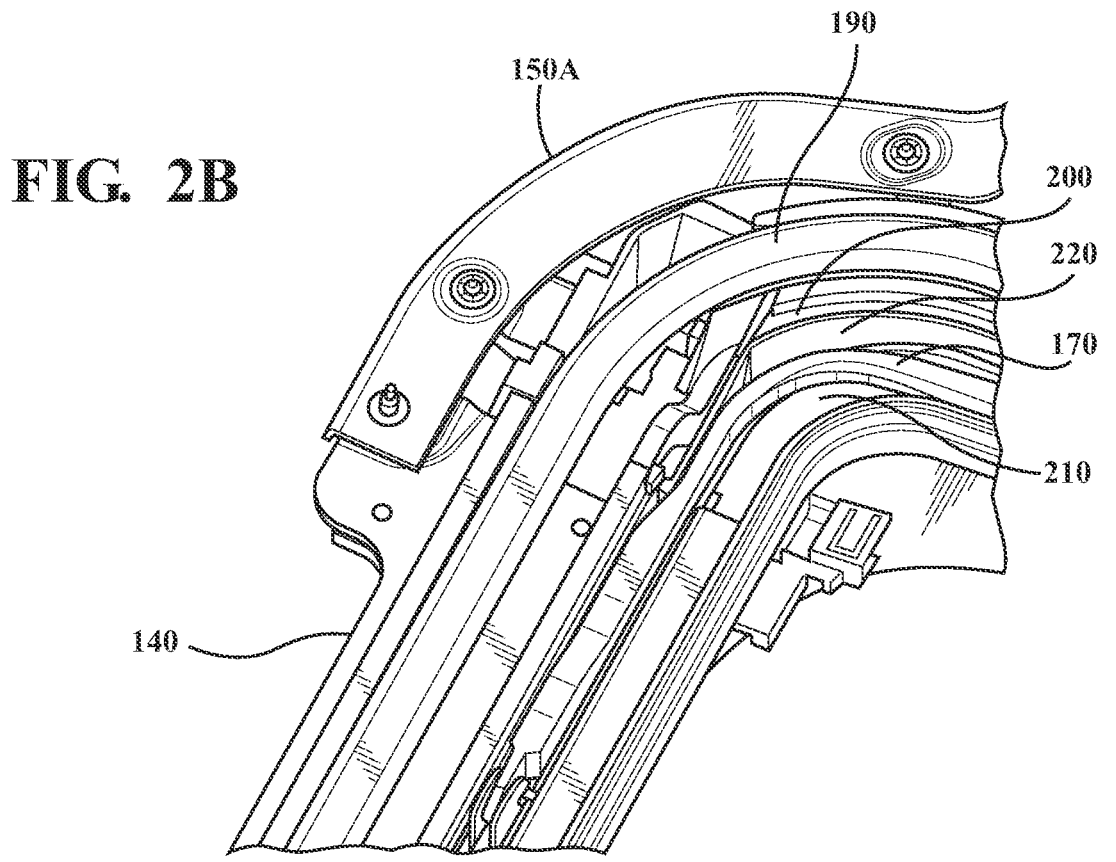
FIG. 2B illustrates a perspective view of a corner of the sunroof assembly.

Referring now to FIGS. 2A and 2B, and as mentioned above, the water management system separates a wet area 200 from a dry area 210. Among other components described below, and in one approach, the water management system includes a housing wall 220 located in the housing 140 and separating the wet area 200 from the dry area 210 within the housing 140. In one example, the housing wall 220 is formed unitarily as one piece with the housing 140. In other examples, the housing wall 220 is formed as a separate component from the housing 140 that is later connected to the housing 140. In one arrangement, for example, as shown, the deflector 160 is located in the housing 140 behind the housing wall 220 with respect to the longitudinal direction of the vehicle. Moreover, in one arrangement, the deflector 160 is located below a top edge of the housing wall 220. Placement of the deflector 160 below the top edge of the housing wall 220 may help prevent moisture from entering the dry area 210 and contacting the deflector 160.

In one arrangement, for example, as shown in FIG. 2B, the housing wall 220 substantially follows the shape of the housing 140. Accordingly, in one arrangement, the housing wall 220 curves in a direction along the first front corner 150A. It should be understood that the housing wall 220 also curves in a direction along the second front corner 150B. Accordingly, the housing wall 220 separates the wet area 200 from the dry area 210 within a region of the sunroof assembly 130 substantially contained to the housing 140. Together with other components of the sunroof assembly 130, in one approach, the housing wall 220 forms a boundary wall that separates the wet area 200 from the dry area 210. Separation of the wet area 200 from the dry area 210 in the remainder of the sunroof assembly 130 is described in further detail below.

Figure 3A:
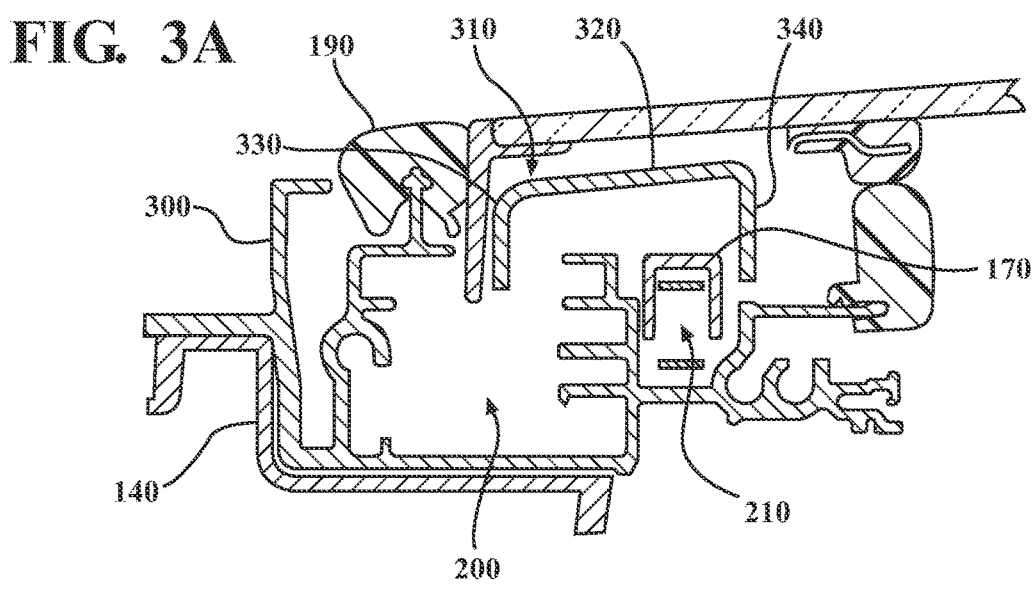
FIG. 3A illustrates a cross-sectional view of the sunroof assembly taken along the line B-B of FIG. 1B.
Figure 3B:
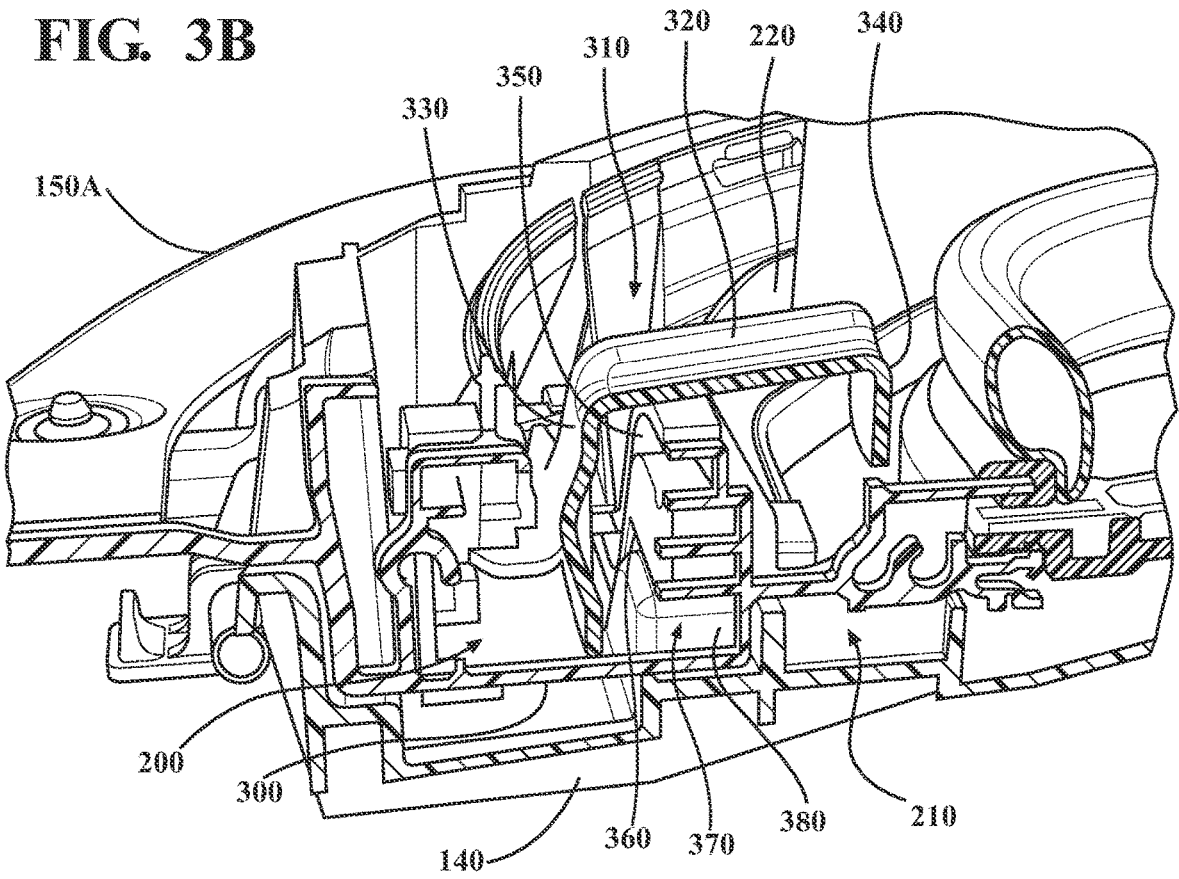
FIG. 3B illustrates a perspective view of the cross-section of FIG. 3A.

Referring now to FIGS. 3A and 3B, in addition to the aforementioned components, the sunroof assembly 130, in the illustrated embodiment, includes a pair of guiderails. In one arrangement, the guiderails include a first guiderail 300 and a second guiderail (shown in FIGS. 1A and 1B). The first guiderail 300 and the second guiderail can be substantially identical in one or more respects, or the first guiderail 300 and the second guiderail are different in one or more respects. In some instances, the second guiderail is substantially a mirror image of the first guiderail 300 with respect to the longitudinal direction of the vehicle. In either case, the guiderails are laterally spaced apart from one another about the sunroof panel 120, with the same lateral spacing as the roof guiderails, and extend longitudinally with respect to the vehicle. With the sunroof panel 120 vertically aligned with the sunroof opening, and the guiderails vertically aligned with the roof guiderails, the sunroof assembly 130 is mountable to the body, over the sunroof opening, from below. To mount to the body, in one approach, the guiderails are secured to the roof panel along their lengths. The sunroof panel extends laterally between the guiderails, which support the sunroof panel 120 for movement between the open position and the closed position. More specifically, the guiderails guide the sunroof panel 120, the sunshades, and the driving equipment between the open position and the closed position. Accordingly, in one arrangement, the sunroof panel 120 is slidingly connected to the guiderails for longitudinal movement, by the driving equipment, between the open position and the closed position. While the remainder of this disclosure is described with reference to the first guiderail 300, it will be understood that the description herein also applies to the second guiderail.

When the sunroof assembly 130 is assembled, in one arrangement, at least a portion of the first guiderail 300 overlies a portion of the housing 140. An example of an area where the first guiderail 300 overlies the housing 140 is shown in FIG. 3B. In one arrangement, the first guiderail 300 forms the boundary wall at an area past the housing 140 in a longitudinal direction of the vehicle. More specifically, in one approach, the first guiderail 300 forms the boundary wall from an area at or near where the housing 140 ends until the end of the first guiderail 300. Accordingly, along the first guiderail 300, the first guiderail 300 substantially prevents water from entering the dry area 210 from the wet area 200.

With continued reference to FIGS. 3A and 3B, the sunroof assembly 130, in one arrangement, also includes a pair of brackets supported by the guiderails and connected to the sunroof panel 120. The brackets are, in some instances, part of the driving equipment used to drive the sunroof panel 120 between the open position and the closed position. Accordingly, in one approach, the brackets support the sunroof panel 120 for movement along the guiderails. The brackets include, in one example, a first bracket 310 supported by the first guiderail 300 and a second bracket (not shown) supported by the second guiderail. More specifically, the first bracket 310 and the second bracket, in one example, are connected to the sunroof panel 120 and are respectively supported for movement by the first guiderail 300 and the second guiderail in the longitudinal direction of the vehicle. While the remainder of this disclosure is described with reference to the first bracket 310, it will be understood that the description herein also applies to the second bracket.

In one arrangement, the first bracket 310 includes a bracket top 320, a first bracket side 330, and a second bracket side 340. The bracket top 320, in one example, is substantially aligned in the X-Y plane (with respect to the axes of FIG. 1A), extends longitudinally with respect to the vehicle, and is attached to the sunroof panel 120. The first bracket side 330 and the second bracket side 340, in one example, extend substantially in the Z-direction from the bracket top 320. Accordingly, in one approach and as described in further detail below, the first bracket 310 straddles a portion of the first guiderail 300. In some instances, the first bracket also straddles a portion of the deflector 160. In addition to the guiderails and the brackets and as a part of the driving equipment, in one example, the sunroof assembly 130 includes a pair of front guides. More specifically, in one approach, the sunroof assembly 130 includes a first front guide 350 corresponding to the first guiderail 300 and the first bracket 310 and a second front guide (not shown) corresponding to the second guiderail and the second bracket. While the remainder of this disclosure is described with reference to the first front guide 350, it will be understood that the description herein also applies to the second front guide. In some instance, the first front guide 350 is connected to the housing 140 and lifts the driving equipment, including the first bracket 310, in order to facilitate movement of the sunroof panel 120 from the open position to the closed position.

At the area where the first guiderail 300 overlies the housing 140, in other words, where the housing wall 220 meets the first guiderail 300, the aforementioned components of the sunroof assembly 130, in one arrangement, function together to separate the wet area 200 from the dry area 210. With continued reference to FIG. 3B, in one arrangement, the first front guide 350 meets the first guiderail 300 and the housing wall 220. At the junction of the first front guide 350, the first guiderail 300, and the housing 140, small spaces may exist between the components, which may cause water to leak into the dry area 210 from the wet area 200. Accordingly, as described in further detail below, the placement and geometry of the aforementioned components, in some instances, may mitigate leakage of water into the dry area 210.

In one arrangement, the first front guide 350 includes a raised portion 360 such that the first front guide 350 meets the first guiderail 300. Accordingly, to prevent the flow of water under the raised portion 360 into the dry area 210, the housing wall 220 includes, in one example, a first ledge 370 that extends from the housing wall 220 underneath the raised portion 360. It should be understood that in some arrangements, the housing wall 220 also includes a second ledge on the opposite side of the sunroof assembly 130. In one arrangement, at the first ledge 370, the housing wall 220 has a cross-section with a chair-like shape. In addition to a ledge top, which extends underneath the raised portion 360 (and forms a seat of the chair-like cross-section), the first ledge 370 has, in some instances, one or more ledge sides 380 extending from the ledge top to the bottom of the housing 140 (and forming legs of the chair-like cross-section). In one arrangement, the ledge side 380 facing the rear of the vehicle abuts the first guiderail 300.

In some instances, it is possible that water can leak into the dry area 210 through a small space between the ledge top and the first front guide 350. Accordingly, in one arrangement, the first bracket 310 is positioned such that the placement of the first bracket 310 mitigates the flow of water into the dry area 210. As mentioned briefly above, in some arrangements, the first bracket 310 straddles the first guiderail 300. More specifically, in one arrangement, the first bracket 310 straddles the first guiderail 300 such that the first bracket side 330 is located in the wet area 200 and the second bracket side 340 is located in the dry area 210. Moreover, in one approach, the first bracket side 330 overhangs the first front guide 350 and extends past the junction of the first front guide 350 and the ledge top. In such an arrangement, water can travel down the first bracket side 330, past the junction of the first front guide 350 and the ledge top and enter the wet area 200 without substantially permeating the dry area 210. Additionally, in one arrangement, the bracket top 320 has a slope that is angled down toward the wet area 200 to promote the flow of water off of the bracket top 320 into the wet area 200 rather than the dry area 210. Accordingly, the first bracket 310 and the first ledge 370, in one approach, help to seal the dry area 210 from the wet area 200 at a place where the first guiderail 300 and the first front guide 350 meet.

The first front guide 350, the first guiderail 300, the first bracket 310, and the first ledge 370 thus, in some examples, function together to create the boundary wall at the area where the first guiderail 300 overlies the housing 140. Accordingly, in one arrangement, the sunroof assembly includes multiple primary boundary wall areas. First, in one arrangement, the housing wall 220 forms the boundary wall substantially within the housing 140. Second, in one arrangement, the first guiderail 300 forms the boundary wall past the housing 140. Third, in one arrangement, the placement of the first guiderail 300, the first front guide 350, the first ledge 370, and the first bracket 310 forms the boundary wall at an area where the first guiderail 300 overlies the housing 140.

Figure 4:
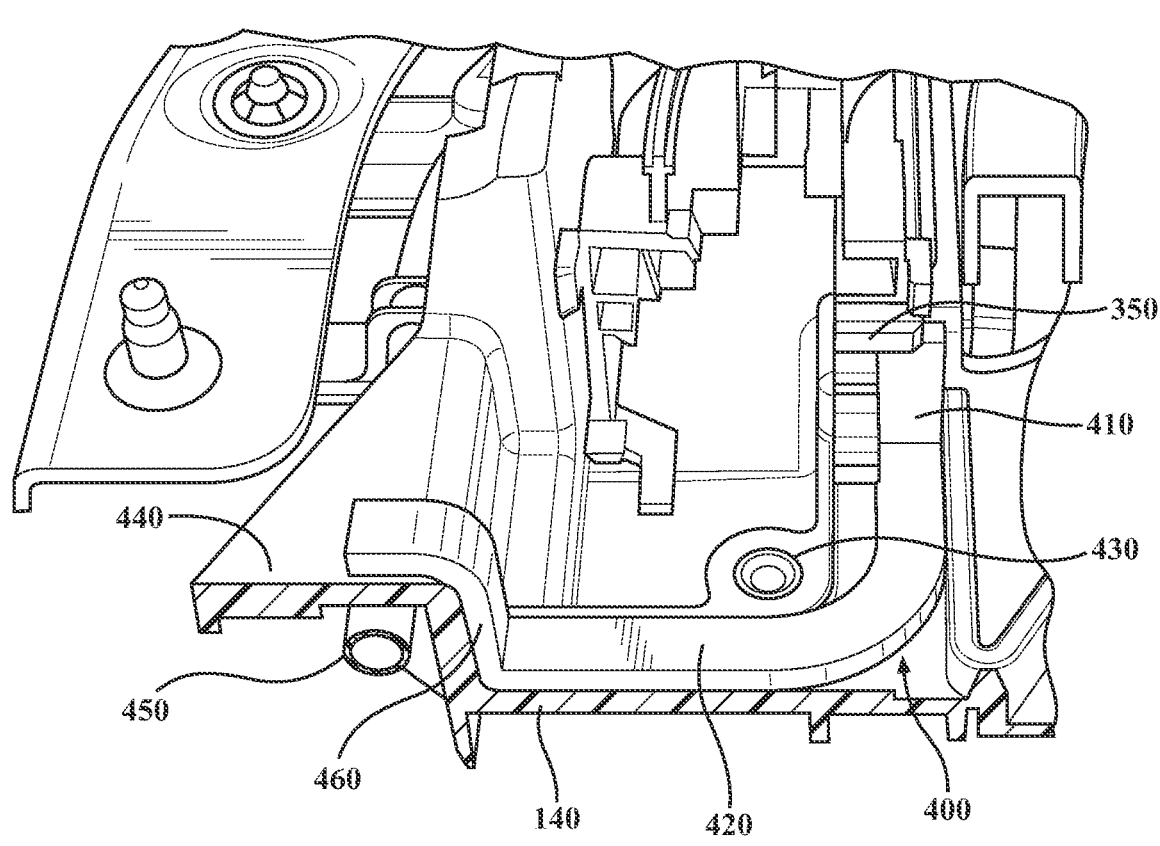
FIG. 4 illustrates a perspective view of a seal of the sunroof assembly.

As described briefly above, when the components of the sunroof assembly 130 are joined, small spaces may exist between the components, which may allow water to travel from the wet area 200 to the dry area 210. For example, when the first guiderail 300 is installed to the housing 140, the first guiderail 300 partially overlies the housing 140, and a space may exist between the first guiderail 300 and the housing 140 due to manufacturing tolerances. Accordingly, referring now to FIG. 4, in addition to the boundary wall, the water management system also includes, in one approach, a first seal 400 configured to further mitigate the flow of water into the dry area 210. The first seal 400, in one example, is located between the housing 140 and the first guiderail 300 where the first guiderail 300 overlies the housing 140. While the remainder of this disclosure is described with reference to the first seal 400, it will be understood that the description herein also applies to a second seal located on the other side of the sunroof assembly 130 in a similar location to the first seal 400 (between the housing 140 and the second guiderail).

In one arrangement, the first seal 400 has a geometry that fits between the components of the sunroof assembly 130 to substantially prevent moisture from entering the dry area 210 from the wet area 200 through various spaces between the housing 140, the housing wall 220, the first front guide 350, and/or the first guiderail 300. For example, the geometry of the first seal 400 substantially prevents moisture from entering the dry area 210 at the following junctions between the components of the sunroof assembly 130: where the first guiderail 300 meets the first ledge 370 and the first front guide 350 and where the first guiderail 300 meets the housing 140. It should be understood that the aforementioned junctions, in some arrangements, also exist on the opposite side of the sunroof assembly 130 and may be sealed by the second seal. In one arrangement, the first seal 400 includes multiple seal portions corresponding to the junctions. Each of the seal portions will be described in further detail below, and it will be understood that the second seal may also include one or more of the below-described seal portions.

In one arrangement, a first seal portion is a vertical seal portion 410. As used herein, "vertical" means substantially along the Z-axis. In one example, the vertical seal portion 410 is located where the first guiderail 300 meets the ledge side 380. Accordingly, the vertical seal portion 410, in one approach, seals a space between the first guiderail 300 and the ledge side 380 to substantially prevent water from entering the dry area 210 through the space between the first guiderail 300 and the ledge side 380.

In one arrangement, a second seal portion is a curved seal portion 420. The curved seal portion 420 is located between the first guiderail 300 and the housing 140. More specifically, the curved seal portion 420, in one example, lies substantially flat on the housing 140 underneath the first guiderail 300. In one arrangement, the curved seal portion 420 has a curved geometry to allow access to an aperture 430 in the housing. The aperture 430, in one arrangement, is a threaded insert that receives a fastener for connecting the first guiderail 300 to the housing 140. Accordingly, the curved seal portion 420, in one approach, curves around the aperture 430 so that access to the aperture 430 is not blocked. Thus, the curved seal portion 420 may substantially prevent water from entering the dry area 210 through a space between the first guiderail 300 and the housing 140.

In some arrangements, in addition to the aperture 430, the housing 140 includes a flange 440. The flange 440, in one example, is a portion of the housing 140 that curves up and around a drain tube 450 for connection to the vehicle. The drain tube 450, in one arrangement, is configured to drain water from the wet area 200 to the outside of the vehicle. Accordingly, in one arrangement, a third seal portion is an arched seal portion 460 that is located where the first guiderail 300 meets the flange 440. The arched seal portion 460, in one approach, extends up and around the flange 440. Thus, in some instances, the arched seal portion 460 substantially prevents water from entering the dry area 210 through the space between the first guiderail 300 and the flange 440.

In one arrangement, the first seal 400 is made of a material used for substantially sealing the dry area 210 from the wet area 200. For example, the first seal 400 is made from foam. In one arrangement, for example, as shown, the seal portions are unitarily formed. In another arrangement, the seal portions are formed as separate components that are installed separately to the sunroof assembly 130 or joined together for installation as a unit to the sunroof assembly 130.

Together with the boundary wall, the seal and other components and arrangements described herein have the advantage of providing a separate wet area of the sunroof assembly from a dry area of the sunroof assembly where the deflector is stored. Separation of the wet and dry areas substantially prevents water from contacting the deflector, thus limiting significant issues to the deflector that result from the deflector contacting water.

Detailed embodiments are disclosed herein. However, it is to be understood that the disclosed embodiments are intended only as examples. Therefore, specific structural and functional details disclosed herein are not to be interpreted as limiting but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ," as used herein, refers to and encompasses any and all possible combinations of one or more of the associated listed items. As an example, the phrase "at least one of A, B, and C" includes A only, B only, C only, or any combination thereof (e.g., AB, AC, BC, OR ABC).

Aspects herein can be embodied in other forms without departing from the spirit or essential attributes thereof. Accordingly, reference should be made to the following claims, rather than to the foregoing specification, as indicating the scope thereof.

What is claimed is:

1. A sunroof assembly, comprising:
a bracket configured for attachment to a sunroof panel;
a guiderail supporting movement of the bracket, whereby movement of the bracket causes movement of the sunroof panel; and
a housing defining a housing wall, wherein the housing wall and the guiderail form a boundary wall separating a wet area of the sunroof assembly from a dry area of the sunroof assembly, and wherein the bracket straddles the boundary wall such that a first side of the bracket is located in the wet area and a second side of the bracket is located in the dry area.

2. The sunroof assembly of claim 1, wherein the housing wall defines a ledge located under a front guide of the sunroof assembly, and wherein the first side of the bracket extends past the ledge to substantially prevent moisture from entering the dry area through a space between the ledge and the front guide.

3. The sunroof assembly of claim 1, further comprising a deflector located in the dry area and at least partially in the housing.

4. The sunroof assembly of claim 1, wherein the guiderail at least partially overlies the housing and further comprising a seal located between the guiderail and the housing where the guiderail overlies the housing.

5. The sunroof assembly of claim 4, wherein the housing wall defines a ledge located under a front guide of the sunroof assembly, and wherein the seal includes a vertical seal portion that is located between the guiderail and the ledge and that abuts the ledge to substantially prevent moisture from entering the dry area through a space between the guiderail and the ledge.

6. The sunroof assembly of claim 4, wherein the housing includes a flange for connecting the housing to a vehicle, and wherein the seal includes an arched seal portion that is located between the flange and the guiderail.

7. The sunroof assembly of claim 4, wherein the seal includes a curved seal portion that curves around an aperture in the housing configured to receive a connector for joining the guiderail and the housing.

8. A sunroof assembly, comprising:
a bracket configured for attachment to a sunroof panel;
a guiderail supporting movement of the bracket, whereby movement of the bracket causes movement of the sunroof panel; and
a housing defining a housing wall, wherein the housing wall and the guiderail form a boundary wall separating a wet area of the sunroof assembly from a dry area of the sunroof assembly where a deflector is housed, wherein the bracket straddles the boundary wall such that a first side of the bracket is located in the wet area and a second side of the bracket is located in the dry area, and wherein the first side of the bracket extends past the boundary wall to substantially prevent moisture from entering the dry area and contacting the deflector.

9. The sunroof assembly of claim 8, wherein the housing wall defines a ledge located under a front guide of the sunroof assembly, and wherein the first side of the bracket extends past the ledge to substantially prevent moisture from entering the dry area through a space between the ledge and the guiderail and contacting the deflector.

10. The sunroof assembly of claim 8, wherein the guiderail at least partially overlies the housing, and further comprising a seal located between the guiderail and the housing where the guiderail overlies the housing.

11. The sunroof assembly of claim 10, wherein the housing wall defines a ledge located under a front guide of the sunroof assembly, and wherein the seal includes a vertical seal portion that is located between the guiderail and the ledge and that abuts the ledge to moisture from entering the dry area through a space between the guiderail and the ledge.

12. The sunroof assembly of claim 10, wherein the housing includes a flange for connecting the housing to a vehicle, and wherein the seal includes an arched seal portion that is located between the flange and the guiderail.

13. The sunroof assembly of claim 10, wherein the seal includes a curved seal portion that curves around an aperture in the housing configured to receive a connector for joining the guiderail and the housing.

14. A sunroof assembly, comprising:
a bracket configured for attachment to a sunroof panel;
a guiderail supporting movement of the bracket, whereby movement of the bracket causes movement of the sunroof panel;
a housing at least partially underlying the guiderail and defining a housing wall, wherein the housing wall and the guiderail form a boundary wall separating a wet area of the sunroof assembly from a dry area of the sunroof assembly; and
a seal located between the guiderail and the housing where the housing underlies the guiderail and substantially preventing moisture from entering the dry area through a space between the guiderail and the housing.

15. The sunroof assembly of claim 14, wherein the bracket straddles the boundary wall such that a first side of the bracket is located in the wet area and a second side of the bracket is located in the dry area.

16. The sunroof assembly of claim 15, wherein the housing wall defines a ledge located under a front guide of the sunroof assembly, and wherein the first side of the bracket extends past the ledge to substantially prevent moisture from entering the dry area through a space between the ledge and the guiderail.

17. The sunroof assembly of claim 14, further comprising a deflector located in the dry area and at least partially in the housing.

18. The sunroof assembly of claim 14, wherein the housing wall defines a ledge located under a front guide of the sunroof assembly, and wherein the seal includes a vertical seal portion that is located between the guiderail and the ledge and that abuts the ledge to moisture from entering the dry area through a space between the guiderail and the ledge.

19. The sunroof assembly of claim 14, wherein the housing includes a flange for connecting the housing to a vehicle, and wherein the seal includes an arched seal portion that is located between the flange and the guiderail.

20. The sunroof assembly of claim 14, wherein the seal includes a curved seal portion that curves around an aperture in the housing configured to receive a connector for joining the guiderail and the housing.

\* \* \* \* \*